(12) United States Patent
Axelsson (10) Patent No.: US 10,845,467 B2
(45) Date of Patent: Nov. 24, 2020

(54) LOW PHOTON COUNT TIMING

(71) Applicant: AIRBORNE HYDROGRAPHY AB, Jönköping (SE)

(72) Inventor: Andreas Axelsson, Bankeryd (SE)

(73) Assignee: AIRBORNE HYDROGRAPHY AB, Jönköping (SE)

( * ) Notice: Subject to any disclaimer, the term of this patent is extended or adjusted under 35 U.S.C. 154(b) by 394 days.

(21) Appl. No.: 15/434,023

(22) Filed: Feb. 15, 2017

(65) Prior Publication Data
US 2017/0234973 A1    Aug. 17, 2017

(30) Foreign Application Priority Data

Feb. 15, 2016  (EP) .................................. 16155773

(51) Int. Cl.
*G01S 7/486* (2020.01)
*G01S 17/10* (2020.01)
(Continued)

(52) U.S. Cl.
CPC ............ *G01S 7/4861* (2013.01); *G01S 7/487* (2013.01); *G01S 7/4817* (2013.01);
(Continued)

(58) Field of Classification Search
CPC ...... G01S 7/4817; G01S 7/4861; G01S 17/10; G01S 7/487; G01S 17/89; G01S 7/4865; G01S 17/42
(Continued)

(56) References Cited

U.S. PATENT DOCUMENTS 6,342,701 B1   1/2002  Kash
2009/0185159 A1   7/2009  Rohner et al.
(Continued)

FOREIGN PATENT DOCUMENTS

CN       101449181 A     6/2009
CN       101776760 A     7/2010
(Continued)

OTHER PUBLICATIONS

"Photon statistics," Wikipedia, downloaded Mar. 16, 2020 as https://en.wikipedia.org/wiki/Photon_statistics, 6 pp. (Year: 2020).*
(Continued)

*Primary Examiner* — Daniel L Murphy
(74) *Attorney, Agent, or Firm* — Maschoff Brennan (57) ABSTRACT

The invention relates to a method and a device for determining a return time of a returning light pulse by a Single Photon (SPL) LiDAR scanner, the SPL scanner comprising of a low photon count detector for converting low amounts of photons or single photons to electrical signals, and a control and processing unit for processing the data and for determining the return time of the returning light pulse. The control and processing unit identify detected photons potentially representing a return pulse event and create a return pulse signal based on a criterion involving a temporal probability distribution for the detected photons, identify a rising edge and a falling edge of the return pulse signal, and determine the return time for each return pulse event based on the rising edge and the falling edge of the return pulse signal.

19 Claims, 5 Drawing Sheets

(51) Int. Cl.
  *G01S 7/481* (2006.01)
  *G01S 7/4861* (2020.01)
  *G01S 7/4865* (2020.01)
  *G01S 7/487* (2006.01)
  *G01S 17/42* (2006.01)
  *G01S 17/89* (2020.01)

(52) U.S. Cl.
  CPC ............ *G01S 7/4865* (2013.01); *G01S 17/10* (2013.01); *G01S 17/42* (2013.01); *G01S 17/89* (2013.01)

(58) Field of Classification Search
  USPC ........................................................ 356/5.01
  See application file for complete search history.

(56) References Cited

U.S. PATENT DOCUMENTS

| | | |
|---|---|---|
| 2013/0250273 A1 | 9/2013 | Ludwig |
| 2014/0021356 A1 | 1/2014 | Zwaans et al. |
| 2015/0041625 A1 | 2/2015 | Dutton et al. |
| 2015/0338270 A1 | 11/2015 | Williams et al. |
| 2015/0364635 A1* | 12/2015 | Bodlovic .................. G01J 1/44 250/214.1 |

FOREIGN PATENT DOCUMENTS

| | | |
|---|---|---|
| CN | 103064076 A | 4/2013 |
| CN | 103460072 A | 12/2013 |

OTHER PUBLICATIONS

Murphy, "Statistics of Photon Arrival Time," 2001, downloaded Mar. 20, 2020 as https://tmurphy.physics.ucsd.edu/apollo/doc/arrival.pdf, 11 pp. (Year: 2001).*

"Poisson point process," Wikipedia, downloaded Mar. 20, 2020 as https://en.wikipedia.org/wiki/Poisson_point_process, 21 pp. (Year: 2020).*

Vacek et al., "Single photon laser altimeter simulator and statistical signal processing", Advances in Space Research, vol. 51, Issue 9, 2013, pp. 1649-1658.

EP Search Report dated Jul. 26, 2016 as received in Application No. 16155773.1.

* cited by examiner

LOW PHOTON COUNT TIMING

FIELD OF THE INVENTION

The invention relates to a Single Photon LiDAR scanner and a method for determining a return time of a returning light pulse, in particular for measuring the time between an outgoing pulse event and a return pulse event in an aerial LiDAR surface scan.

BACKGROUND

In the field of optical or optoelectronic range measurements, respectively, different principles and methods are known for the determination of a distance to a measurement target. In one approach a pulsed electromagnetic radiation, e.g. a pulsed laser beam, is emitted towards the target and the distance is measured by detecting the backscattered pulse coming from the target while timing the pulse Time-of-Flight (ToF) which is proportional to the distance to the target. Such ToF devices have been established to be a standard solution in many range measurement applications.

Range LiDAR is often operated in one of two modes. In a linear mode a high energy pulse is transmitted, resulting in a pulse return signal that is high enough for treatment as an analog signal, wherein the signal amplitude is proportional to the target reflectivity. In the so-called Single (low count) Photon LiDAR mode, in the following called SPL mode, a low energy pulse is used, resulting in a low return pulse signal, wherein each package of returning photons is treated as an event and normally no amplitude information is available.

For linear mode operation the pulse is often captured with high speed analog-to-digital (ADC) conversion and then analysed to give very good accuracy (<1 cm) range measurements. Since analog signals contain amplitude and slewrate information, range bias effects due to nonlinearities and signal processing effects can be characterized and corrected for and thus high accuracies for a wide range of returning pulse strengths are achieved.

For Single Photon LiDAR mode normally no amplitude or slewrate information is available and bias, nonlinearity, and noise effects cannot easily be corrected for. To mitigate the lack of this information, often very short pulses (<1 ns) are used to accurately determine the ranges. This however does not solve any problems due to nonlinear timing behaviour in the detector.

A SPL system contains the following major components:
a transmitter for transmitting a light pulse,
a low photon count detector for detecting a returning light pulse, adapted for converting low amounts of photons or single photons to electrical signals, and
a control and processing unit for processing the data and for determining the return time of the returning light pulse.

For example, some systems use a single photon avalanche detector (SPAD) or a Geiger mode avalanche photodiode (gmAPD) which can convert a received photon package to one event. The generated signal is not proportional to the number of photons in the package. Other systems use photomultiplier tubes (PMT), silicon photomultipliers (SiPM), microchannel plate detectors (MCP), or hybrid detectors such as intensified photodetectors (IPD) to convert a photon package to electrical signal. The signal is proportional to the number of photons detected in the package, i.e. from a signal point of view these kind of detectors provide more information than SPAD or gmAPD detectors.

The control and processing unit usually comprises timing electronics for converting electrical signals (pulses) to time information. Usually this is done with a time to digital converter (TDC), wherein the signal is first converted into a binary electrical signal, which is usually done with a high speed comparator.

For a strong analog signal a constant fraction discriminator (CFD) circuit can be used to accurately determine a position to use for timing. For low photon counts with PMT, SiPM, MCP, or IPD a CFD may not give good results. For SPAD and gmAPD the CFD is not commonly used as—technically—it does not bring particular benefits.

As usually no amplitude information is available after the signal has been detected and made into a binary timing signal, the work to discriminate the wanted signal from other random noise events (caused by solar background or thermal effects in the detector) is to compare ranges with surrounding measurements.

Typically the TDC measures the rising edge of the binary timing signal. In the detector there is a probability that a photon will create a photoelectron to be amplified and converted into an electrical signal going to the timing circuit. Normally the threshold for detecting the signal is set to correspond to only one or a few photons in amplitude. Since the transmitted pulse often has a Gaussian shape the part of the leading and falling tails that is above the threshold increases when the reflected pulse gets stronger. Therefore, when timing the rising edge of the signal an amplitude dependent timing bias is present, typically referred to as "range walk" effect in literature. To correct the "range walk" effect an amplitude information must be known.

3D LiDAR mapping can be used to create an accurate 3D representation of the world. The increased resolution and production rate has pushed the technology to use stronger lasers and more sensitive detectors. However, stronger lasers impose problems with power consumption and safety issues, whereas the sensitivity of the detectors is limited by the quantum discretization at low levels (discrete photons).

SUMMARY

Some embodiments of the present invention provide an improved method and an improved system mitigating limitations in high resolution 3D LiDAR mapping.

Some embodiments of the invention is provide an improved method and an improved system to mitigate and eliminate problems encountered when dealing with weak return pulse signals, particularly in Single Photon LiDAR scanners taking aerial surface scans of an overflown terrain.

Some embodiments of the invention further mitigate amplitude dependent timing errors in a Single Photon LiDAR scanner commonly referred to "range walk" effects.

According to the invention a method is presented for determining a return time of a returning light pulse by a Single Photon LiDAR scanner, in the following called SPL scanner, in particular in an aerial LiDAR surface scan, a terrestrial monitoring scan, a mobile mapping scan, or a construction and (high definition) surveying scan, in particular for measuring the time between an outgoing pulse event and a return pulse event, the SPL scanner comprising of a low photon count detector for converting low amounts of photons or single photons to electrical signals, and a control and processing unit for processing the data and for determining the return time of the returning light pulse. The method is characterized in that the control and processing unit identifying a group of detected photons potentially representing a return pulse event and creating a return pulse signal based on a criterion involving a temporal probability distribution for the detected photons, in particular a defined minimum of consecutively detected low amounts of photons or single photons, identifying a rising edge and a falling edge of the return pulse signal based on the identified group of detected photons potentially representing a return pulse event, and determining the return time for each return pulse event based on the rising edge and the falling edge of the return pulse signal.

Using both the rising and the falling edge of the return pulse signal for determining the return time of the return pulse event has several advantages, in particular for eliminating a large portion of the "range walk" bias effect.

As the leading and the falling tail will move in opposite directions for changes in amplitude, the average of the two will stay more or less constant and thus the determination of the return time of the return pulse event is more stable and more or less independent of amplitude (or gain) effects.

Furthermore, by averaging between rising and falling signals, the jitter noise of the time to digital conversion is lowered due to the averaging of two independent variables. The jitter associated with gain variation in the detector is also largely eliminated due to the negative correlation between the rise and falling time events.

In a particular embodiment of the invention the detector of the SPL scanner is adapted to convert a single photon or a photon package to an electrical signal and the electrical signal is proportional to the number of photons detected in the package, the detector being a single-element detector, a multi-element detector, or a detector array, in particular the detector being a photomultiplier tube, a silicon photomultiplier, a microchannel plate detector, or a hybrid detector such as an intensified photodetector.

In a further embodiment the detector of the SPL scanner is adapted to convert a single photon or a photon package to an electrical signal representing one event, the detector being a single-element detector, a multi-element detector, or a detector array. Thus in this embodiment the amplitude information is lost but can be derived indirectly if the temporal resolution for detecting consecutive events is high enough for resolving the pulse duration (i.e. the detector duty cycle between photon detections is short enough) and taking into account that the difference in time between the falling and the rising edge (or the signal width between the falling and the rising edge) is related to the amplitude of the return signal.

In another embodiment of the invention the SPL scanner is adapted for creating a multiplicity of return pulse signals based on a multiplicity of different probability thresholds for a photon creating a photoelectron to be converted into an electrical signal, the thresholds respectively being defined to different low amounts of photons in amplitude. In particular, the control and processing unit is further adapted to determine an amplitude information for the return pulse event based on return pulse signal variations between return pulse signals created by applying the different probability thresholds, particularly wherein the amplitude information is used for correcting amplitude dependent timing effects and/or for discriminating amplitude variations due to reflectance variations of a scanned surface area from amplitude variations due to geometric effects of the scanned surface area such as sloping grounds. For example, strong reflected pulses are wide and high, while returns from slopes are wide but not as high.

Also the difference in time between the falling and the rising edge (or the signal width between the falling and the rising edge) is related to the amplitude of the return signal. Thus this information can be used to further correct the timing for nonlinearities and asymmetries in the signal.

Therefore, according to another particular embodiment of the invention the control and processing unit is adapted to determine an amplitude information for the return pulse event based on a time difference between the falling edge and the rising edge of the return pulse signal, in particular wherein the amplitude information is used for correcting amplitude dependent timing effects and/or noise effects.

In particular already a coarse amplitude information can be used to discriminate solar or thermal noise from real signals since multiple noise photons close in time have much lower probability than multiple signal photons close in time. Thus filtering of the generated 3D point cloud can be improved very much, resulting in a cleaner 3D point dataset.

On the one hand, in particular for aerial LiDAR surface scans, the light of the return pulse can be detected by single-element (single-pixel) detectors detecting and processing multi-photon returns, wherein a transmitter of the scanner usually comprises a moving element such as a sweeping or rotating mirror (or prism or refractive optics) directing the laser pulses towards the target (e.g. the ground) according to a given scan pattern.

On the other hand, in particular when using very light-sensitive detectors such as in SPL applications, multi-element (multi-pixel) detector devices are used that are able to detect an incident flux of light (down to a single photon) providing information for each pixel on the number of photons and their arrival times. Usually multiple lidar beams are produced from a single transmitted laser pulse, e.g. by using a diffractive optical element, which then simultaneously illuminate a target (a ground) surface area with a size that is dependent on the distance to the target (e.g. the flying altitude) and the laser aperture. In particular, these kinds of aerial LiDAR systems have the advantage that, thanks to the high detector sensitivity, low energy laser beams can be used and scanning can be performed from high altitudes. Furthermore, since each surface point is scanned from many different viewing angles shadow effects are greatly minimized. However, compared to the single-element scanning systems these kinds of systems are more complex and also require more sophisticated and computing intensive image correlation methods.

The subject matter of the invention does not depend on the type of LiDAR systems, i.e. single-element or multi-element LiDAR.

Therefore, in further embodiments of the invention the SPL scanner is adapted for scanning with a single lidar beam or for simultaneously scanning with multiple lidar beams. In particular scanning can be adapted by means of a sweeping or rotating element (e.g. mirror, prism, refractive element, etc.) of a transmitter optics of the SPL scanner and, if applicable, the multiple lidar beams are produced from a single transmitted laser pulse, in particular by using a diffractive optical element.

The present invention further describes a Single Photon LiDAR scanner, in the following called SPL scanner, in particular an aerial SPL scanner for taking aerial surface scans of an overflown terrain, a terrestrial monitoring scanner, a mobile mapping scanner, or a construction or surveying scanner, the SPL scanner comprising of a transmitter for transmitting a light pulse, a low photon count detector for detecting a returning light pulse, adapted for converting low amounts of photons or single photons to electrical signals, and a control and processing unit for processing the data and for determining the return time of the returning light pulse. The SPL scanner is characterized in that the control and processing unit
- identifying a group of detected photons potentially representing a return pulse event and creating a return pulse signal based on a criterion involving a temporal probability distribution for the detected photons, in particular a defined minimum of consecutively detected low amounts of photons or single photons,
- identifying a rising edge and a falling edge of the return pulse signal based on the identified group of detected photons potentially representing a return pulse event, and
- determining the return time for each return pulse event based on the rising edge and the falling edge of the return pulse signal.

In a particular embodiment of the SPL scanner the detector is adapted to convert a single photon or a photon package to an electrical signal and the electrical signal is proportional to the number of photons detected in the package, the detector being a single-element detector, a multi-element detector, or a detector array, in particular the detector being a photomultiplier tube, a silicon photomultiplier, a microchannel plate detector, or a hybrid detector such as an intensified photodetector.

In a further embodiment the detector of the SPL scanner is adapted to convert a single photon or a photon package to an electrical signal representing one event, the detector being a single-element detector, a multi-element detector, or a detector array.

Another embodiment of the SPL scanner comprises a time to digital converter with a high speed comparator, in the following called TDC.

In a particular embodiment the SPL scanner is adapted for creating a multiplicity of return pulse signals based on a multiplicity of different probability thresholds for a photon creating a photoelectron to be converted into an electrical signal, particularly by using a multiplicity of different comparators for different detector pixels with different detection thresholds, respectively, the thresholds respectively being defined as different low amounts of photons in amplitude, in particular wherein the control and processing unit is adapted to determine an amplitude information for the return pulse event based on return pulse signal variations between return pulse signals created by applying the different probability thresholds, particularly wherein the amplitude information is used for correcting amplitude dependent timing effects and/or for discriminating amplitude variations due to reflectance variations of a scanned surface area from amplitude variations due to geometric effects of the scanned surface area such as sloping grounds.

One particular embodiment of the SPL scanner discloses the control and processing unit being adapted to determine an amplitude information for the return pulse event based on a time difference between the falling edge and the rising edge of the return pulse signal, in particular using the difference in the rise and falling edges of a single comparator channel or of multiple comparator channels, in particular wherein the amplitude information being used for correcting amplitude dependent timing effects and/or noise effects.

In particular embodiments of the scanner according to the invention the SPL scanner is adapted for scanning with a single lidar beam or for simultaneously scanning with multiple lidar beams. In particular scanning can be adapted by means of a sweeping or rotating element of a transmitter optics of the SPL scanner and, if applicable, the multiple lidar beams are produced from a single transmitted laser pulse, in particular by using a diffractive optical element.

Another embodiment of the invention is given by the TDC being implemented using a field programmable gate array as a high resolution timing device, in particular wherein multiple gate delays are used in parallel or series, in particular for accomplishing a higher resolution than dictated by the clock frequency of the field programmable gate array.

The invention further comprises a computer program product to be used within a method according to the invention, the computer program product being stored on a control and processing unit, particularly being part of a Single Photon LiDAR scanner according to the invention, the computer program product comprising program code being configured for
- identifying a group of detected photons potentially representing a return pulse event and creating a return pulse signal based on a criterion involving a temporal probability distribution for the detected photons, in particular a defined minimum of consecutively detected low amounts of photons or single photons,
- identifying a rising edge and a falling edge of the return pulse signal based on the identified group of detected photons potentially representing a return pulse event, and
- determining the return time for each return pulse event based on the rising edge and the falling edge of the return pulse signal.

BRIEF DESCRIPTION OF THE DRAWINGS

In the following, the invention will be described in detail by referring to exemplary embodiments that are accompanied by figures, in which:

FIG. 1a schematic illustration of a state of the art optoelectronic range finder, FIG. 1b schematic illustration of a state of the art pulse time-of-flight distance measurement method, FIG. 2a an exemplary measuring task for an airborne LiDAR scanner scanning with a single lidar beam using a sweeping mirror, FIG. 2b an exemplary measuring task for an airborne LiDAR scanner simultaneously scanning with multiple lidar beams, FIG. 2c an exemplary measuring task for an airborne LiDAR scanner scanning with multiple lidar beams in a circular scan pattern, FIG. 2d an exemplary measuring task for a terrestrial LiDAR scanner for construction monitoring, FIG. 2e an exemplary measuring task for a terrestrial LiDAR scanner for slope monitoring, FIG. 3 an exemplary signal waveform determined by a SPL LiDAR scanner using a detector wherein the electrical detection signal is proportional to the number of photons detected in the package, FIG. 4 an exemplary signal waveform by a SPL LiDAR scanner with a weak and a strong return pulse for illustrating the "range walk" effect, FIG. 5 an exemplary pulse detection by a SPL LiDAR scanner according to the invention using a detector wherein a single photon or a photon package converts to an electrical signal representing one event.

DETAILED DESCRIPTION

Figure 1A:
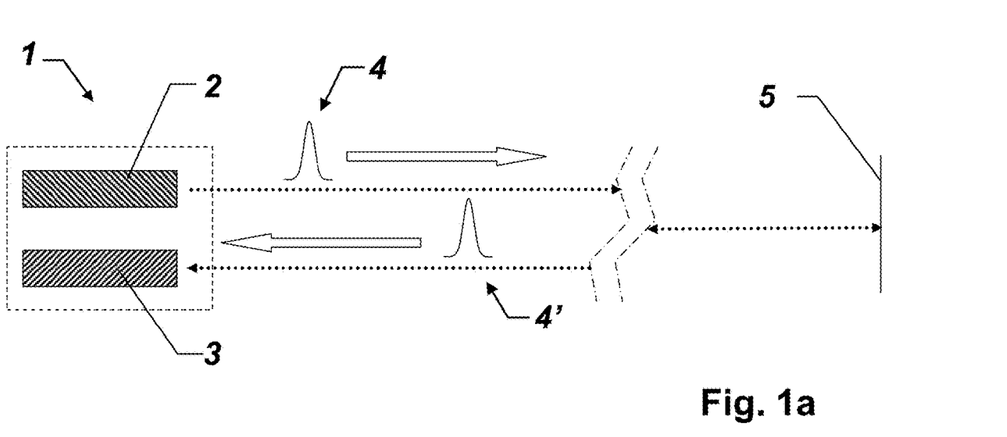
Figure 1B:
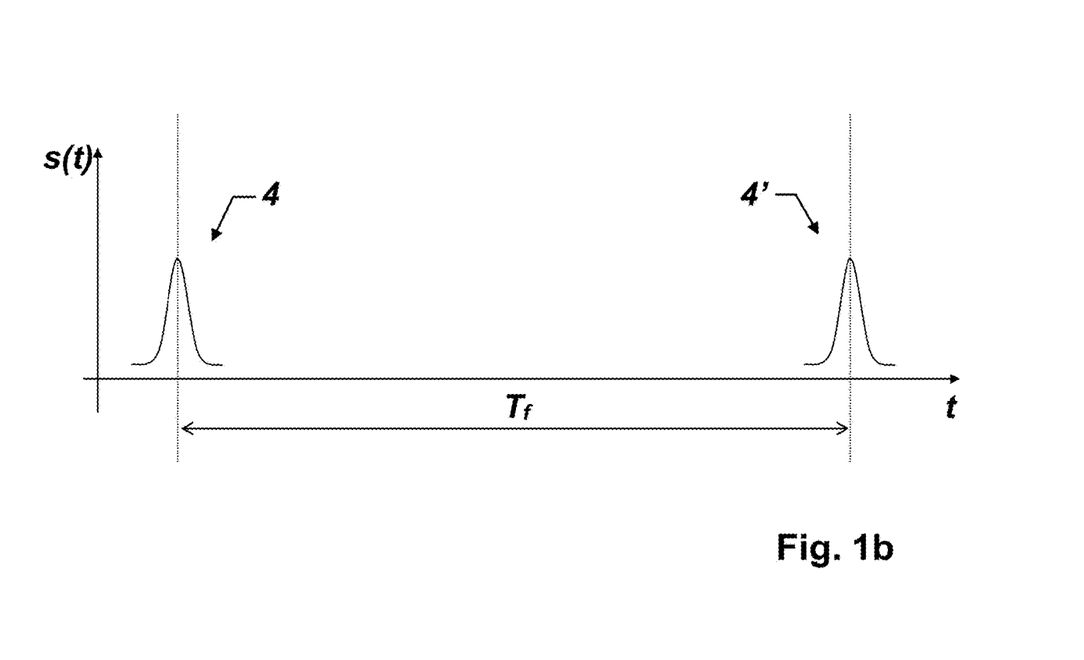

FIG. 1 illustrates the principle of a common optoelectronic range finder device, wherein FIG. 1a shows a schematic illustration of the main components of such an optoelectronic range finder and FIG. 1b shows a schematic illustration of the pulse time-of-flight distance measurement method.

As illustrated by FIG. 1a a range finder 1 comprises a transmitter unit 2 for emitting a light pulse 4 and a receiver unit 3 for detecting the return pulse 4' backscattered from a target 5. Instead of a single light pulse usually an analogue or digital coded pulse pattern or a continuously modulated transmission signal is used.

As shown by the schematic illustration in FIG. 1b the distance to the target is then determined from the time-of-flight $T_f$ of a light pulse, i.e. the time difference between the emission time of a light pulse 4 and the detection time of the backscattered return pulse 4'. For the determination of the return time of the return pulse 4' usually a threshold criterion is used, e.g. the pulse is detected as soon as the signal intensity exceeds a defined threshold.

Figure 2A:
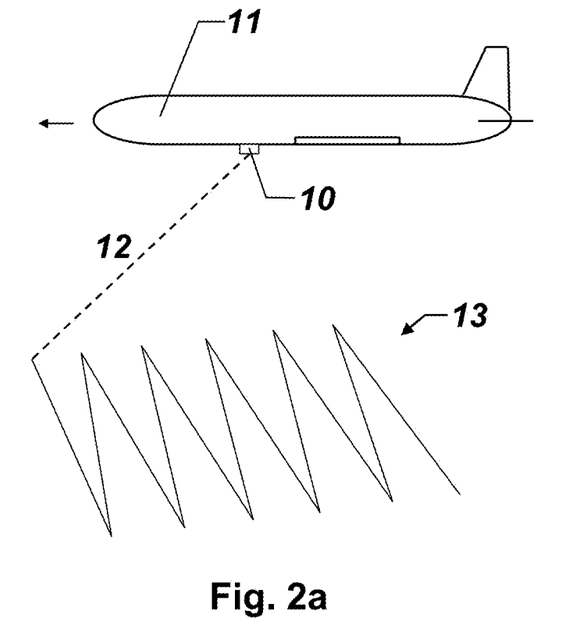

FIG. 2a shows a typical embodiment of a Single Photon LiDAR system 10 according to the invention carried along in a flying object 11. The figure indicates a typical zig-zag scan pattern 13, caused by a sweeping scanner motion, e.g. by a sweeping mirror, and a forward flight movement, wherein an actual scanner pointing direction 12 is indicated. Usually several additional or complementary data sources and measuring devices are used for improving or calibrating the lidar measurement, particularly additional means for determining the position and orientation of the airborne carrier 11, e.g. comprising an altimeter, a device for determining the flight attitude, e.g. giving a yaw angle, a longitudinal angle, and/or a transverse inclination angle of the airplane 11, and measured data of a satellite navigation system carried along in the airplane 11. Furthermore, a known digital 3D model of the overflown terrain might be stored on a central control device of the airplane 11 or on a control and processing unit of the aerial LiDAR system 10.

Figure 2B:
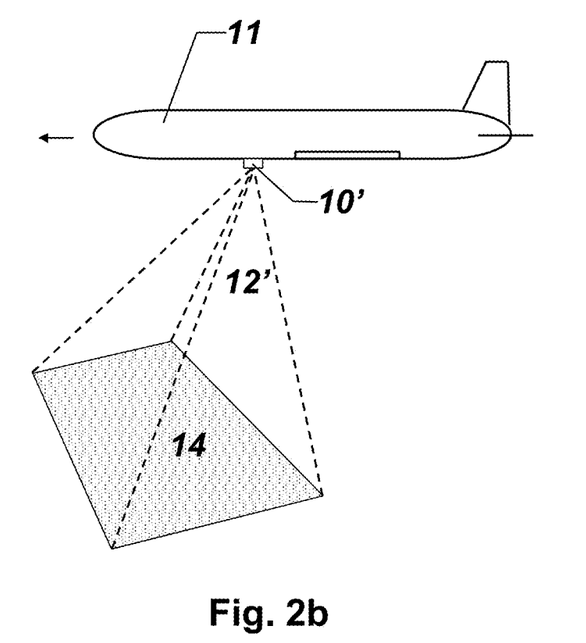

FIG. 2b shows an exemplary measuring task for an airborne LiDAR measuring system 10' for scanning with multiple lidar beams, e.g. here a "staring" 2D scanner is used with a fixed viewing direction 12'. This kind of measuring method is particularly useful when using very light-sensitive detectors such as in SPL applications. Multi-element (multi-pixel) detector devices are able to detect an incident flux of light (down to a single photon) providing information for each pixel on the number of photons and their arrival times. Usually multiple lidar beams are produced from a single transmitted laser pulse which then illuminates a ground surface area 14 with a size that is dependent on the flying altitude and the laser aperture. These kinds of aerial LiDAR systems have the advantage that, thanks to the high detector sensitivity, low energy laser beams can be used and scanning can be performed from high altitudes. Since each surface point is scanned from many different viewing angles shadow effects are greatly minimized.

Figure 2C:
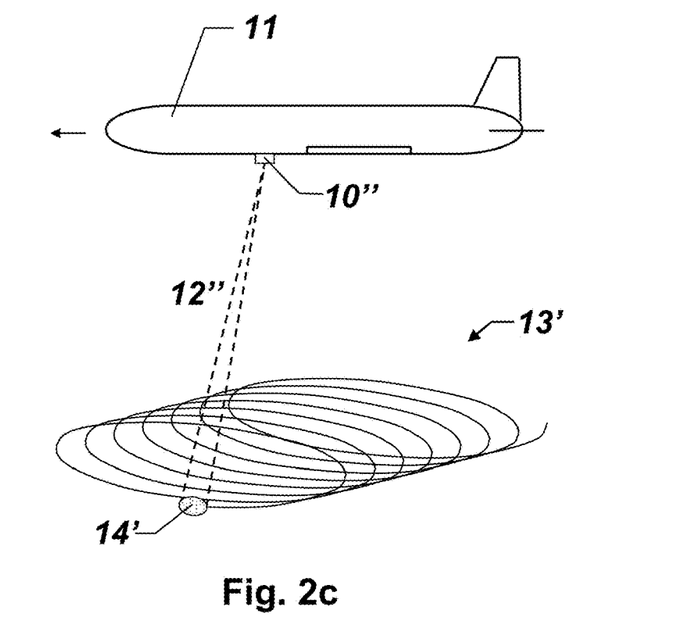

In FIG. 2c another exemplary scan pattern for an aerial LiDAR system 10" is shown, adapted for scanning with a circular scan pattern, e.g. using a rotating tilted deflection mirror. By way of example, here scanning with multiple lidar beams is indicated, illuminating a ground surface area 14', indicated for an actual scanner pointing direction 12", with a size that is dependent on the flying altitude and the laser aperture. Due to the circular scanning by the LiDAR system 10" and the forward flight movement of the carrier 11, the surface area 14' is drawing a spiral scan pattern 13' on the ground. Thanks to the spiral scan pattern 13' and the scanning with a 2D detector each surface point is scanned from different viewing angles and thus shadow effects are greatly minimized, wherein a large area can be scanned with low energy laser pulses of even less energy than with the staring scanner shown in FIG. 2b.

Figure 2D:
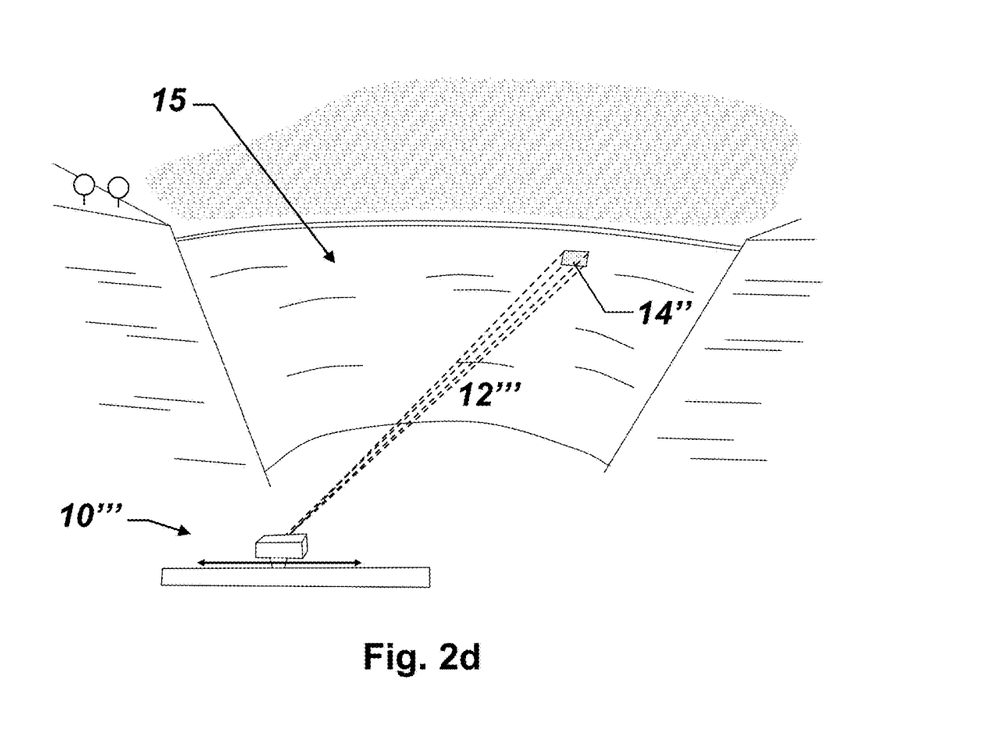

FIG. 2d shows an example of a ground-based LiDAR system 10''' according to the invention, here in the field of construction monitoring, e.g. for monitoring the integrity of a dam 15 by measuring small scale movements of the dam 15 due to the varying water pressure. For example, the LiDAR system 10''' is adapted for scanning of a small area 14" of the dam with high accuracy, e.g. wherein the system 10''' is mounted on a fixed rail for lateral movement and using a tiltable mirror for adjusting the height of the viewing direction 12'''.

Figure 2E:
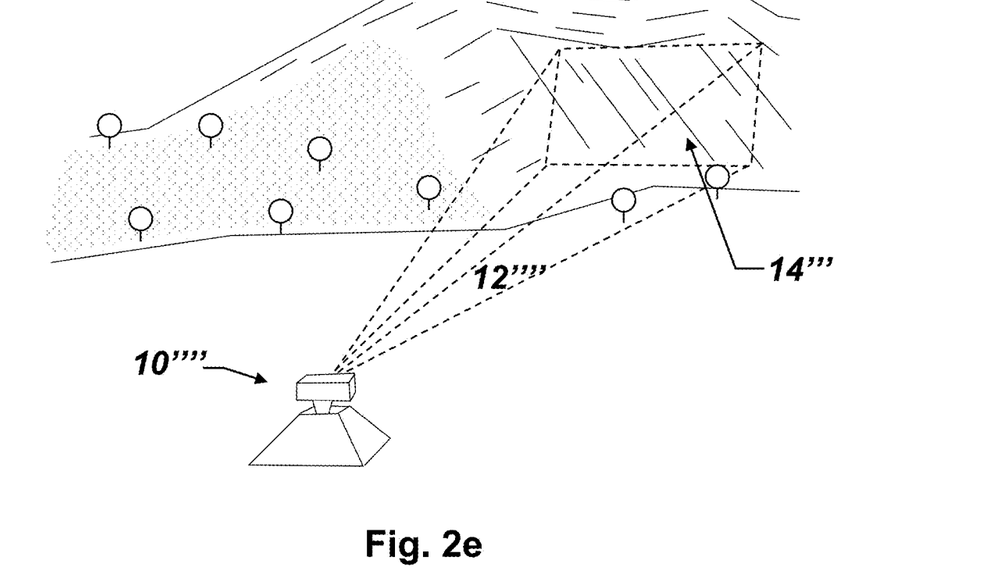

Another exemplary ground-based application is shown in FIG. 2e wherein a LiDAR system according to the invention is used for slope monitoring, e.g. here adapted for a staring configuration with a fixed viewing direction 12'''' towards an instable slope. For example, by using a very light-sensitive multi-element (multi-pixel) LiDAR system 10'''' positioned at a large distance from the target a large slope area 14''' can be scanned simultaneously, which is particularly useful when used as part of an alarm system.

Figure 3:
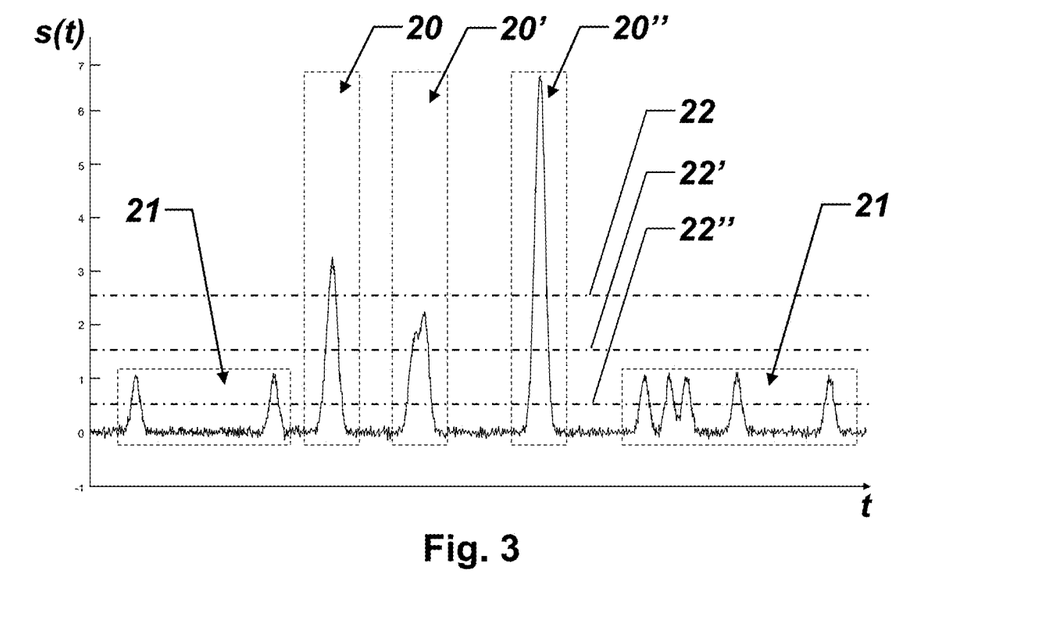

FIG. 3 shows an exemplary waveform s(t) for low photon count return pulses 20,20',20" determined by a SPL scanner. Here, the embodiment relates to a SPL scanner using a detector where the electrical detection signal is proportional to the number of photons detected in the package (as per se known to a skilled person in the art, depending on the type of low photon count detector, the curve could look somewhat different). A number of pulses are shown:

solar photon pulses 21 with amplitudes around 1 photon, a weak pulse 20, e.g. here generated by 4 returning photons from a reflection, a broadened pulse 20', e.g. here generated by 4 returning photons from a reflection on a slanted target, and a stronger pulse 20", e.g. here generated by 8 returning photons from a reflection.

Typically the return pulse signal for SPL applications is at the order of the detection and background noise or only slightly above. Furthermore, the temporal resolution for detecting consecutive events, i.e. the detector duty cycle between consecutive photon detections (e.g. circuitry breakdown-amplification-quench-reset) needs to be short enough for resolving the pulse duration.

In the figure three different (detection) thresholds 22,22', 22" are indicated by horizontal lines. According to the invention, wide pulses with low amplitude 20,20' can be discriminated from wide pulses with high amplitude 20" by using different thresholds, e.g. by respectively determining the signal width at different thresholds. Furthermore, since a multiplicity of noise photons close in time has much lower probability than a multiplicity of signal photons close in time, solar noise 21 can be discriminated from return pulses 20,20',20", with more than one photon in the return, by measuring the width of the pulse.

When using a state of the art threshold method, i.e. when only timing the rising edge, e.g. at the threshold, of a pulse signal 20,20',20",21, particularly for very small thresholds, time stamps determined for strong background signals are confused with the time stamp determined for the actual pulse signal. Furthermore, a threshold dependent—i.e. intensity or gain dependent—kind of "range walk" effect is present as further illustrated by FIG. 4.

Figure 4:
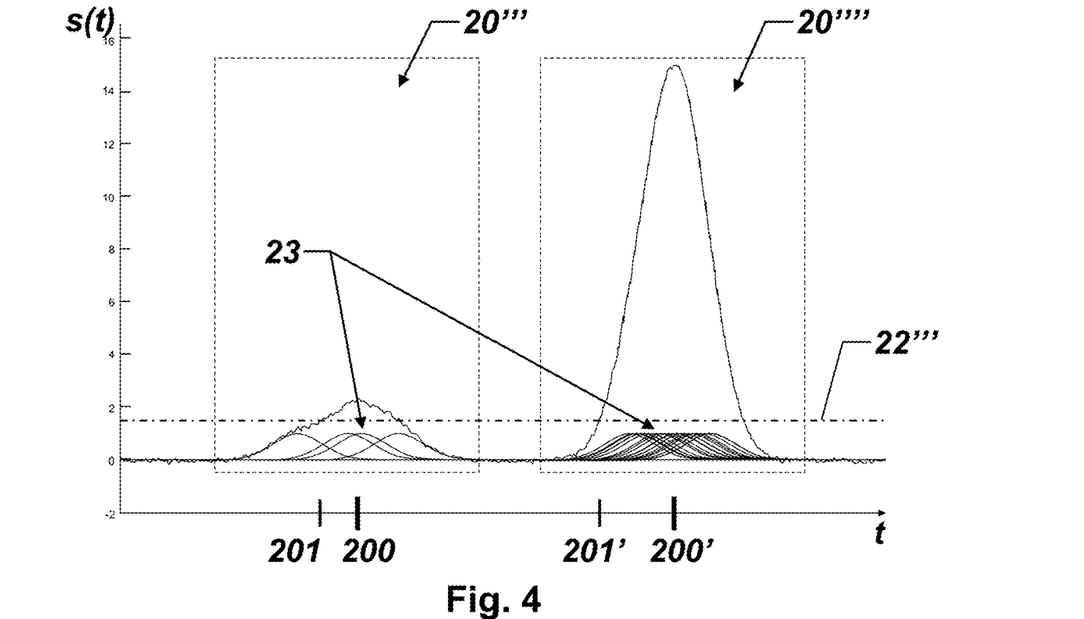

FIG. 4 shows a signal waveform s(t) of a weak return pulse 20''', here of 4 photons, and a strong return pulse 20'''', here of 20 photons, i.e. 5 times as strong as the weak return pulse. Also shown are the individual return photons 23. The position of the rise time stamp 201,201' at the threshold 22''' moves away from the center of the pulse return 200,200' the stronger the pulse gets. Therefore, when only timing the rising edge of the pulse signal, e.g. by a common threshold measurement method, an amplitude dependent timing bias is present, typically referred to as "range walk" effect in literature. Furthermore, geometric and reflective properties of the scanned surface area, such as sloping grounds and vegetation, respectively, alter the amplitude and shape of the return pulse signal. For example, strong reflected pulses are wide and high, while returns from slopes are wide but not as high.

Therefore, for improving the determination of the return time of the return pulse event, and thus for improving the accuracy of the SPL range measurement it is important to improve the accuracy of the determination of the return time of the return pulse. According to the invention information about the shape of a return pulse signal, e.g. at least the signal width of a return pulse, is determined for gaining more information about the scattering process and for discriminating a return pulse from background noise. This is achieved by determining both the rising and the falling edge of the return pulse signal based on which the return time of the return pulse event is determined, e.g. by averaging of the rising and falling edge time stamps. This has several advantages and mitigates a large portion of amplitude dependent effects, particularly large portions related to "range walk" bias effects are canceled thanks to the first order symmetry of a return pulse. In particular, by using and combining detections of the rising and falling edge for different thresholds more information about the amplitude of the return pulse signal is gained.

According to the invention, amplitude dependent effects are mitigated by identifying a group of detected photons potentially representing a return pulse event by identifying a rising edge and a falling edge of a detected pulse signal which are used for determining a return pulse signal, particularly the determination being further based on a criterion involving a temporal probability distribution for the detected photons, in particular a defined minimum of consecutively detected low amounts of photons or single photons. The return time for each return pulse event is then determined based on the rising edge and the falling edge of the return pulse signal.

Figure 5:
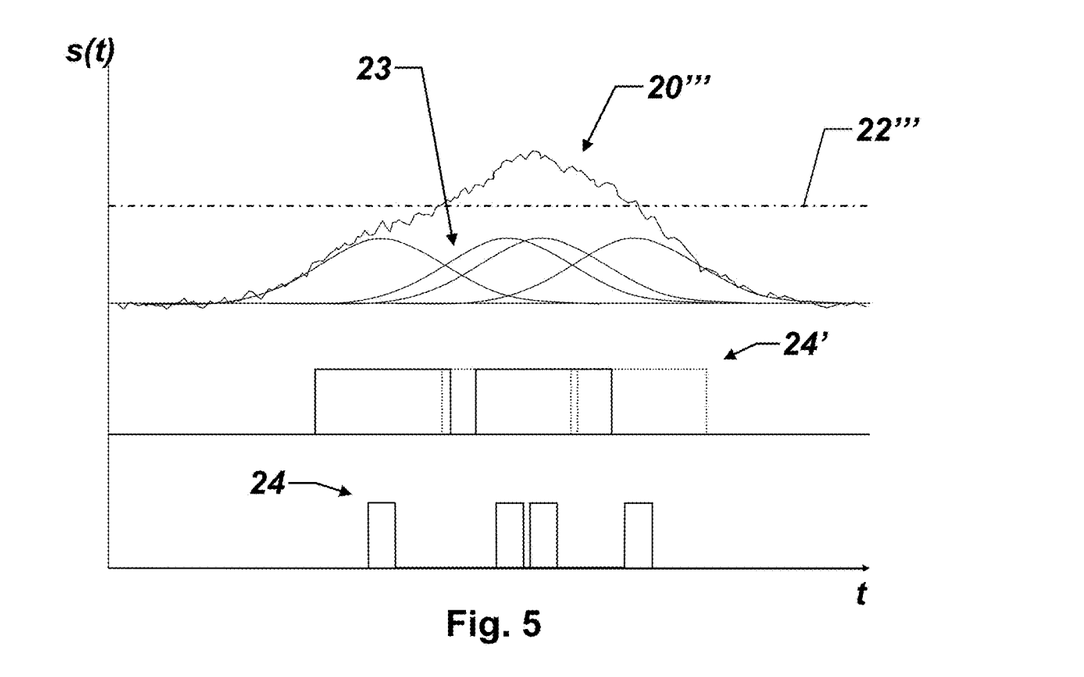

FIG. 5 relates to the same weak return pulse signal 20''' indicated in FIG. 4 but this time the return pulse 20''' is detected using an SPL scanner using a detector wherein a single photon or a photon package converts to an electrical signal representing one event. The step signal 24 produced by such a detector consists of only two values, e.g. 1 for detection and 0 for non-detection, detecting an integer amount of events (s(t)=1)) if the number of photons exceeds a defined gain value (detection threshold). Both the original return pulse signal 20''' and the corresponding detector step signal 24 are indicated, the step signal 24 being offset to the return pulse signal 20'''.

In such an embodiment no direct amplitude information is available. However, a multiplicity of noise photons close in time has much lower probability than a multiplicity of signal photons close in time. Furthermore, the difference in time between the falling and rising edge, i.e. the pulse width, is related to the amplitude of the return signal. Therefore, using a temporal probability criterion for the arriving photons a pulse and a corresponding pulse width, i.e. a coarse amplitude information, can be determined for identification of a return pulse signal corresponding to a return event. For example, such a criterion could be a defined minimum of consecutively detected low amounts of photons or single photons in a short time interval.

However, the detector duty cycle between consecutive photon detections (e.g. circuitry breakdown-amplification-quench-reset) needs to be short enough for resolving the pulse duration. This is illustrated by another detector step function 24' where the detector duty cycle is not fast enough to resolve consecutive photon events and only the first and the third photon are detected. This again introduces an effect similar to the range walk effect. Moreover, it introduces an asymmetry in the digitized pulse signal. For very long detector duty cycles only the first photon is detected and thus only the rising edge is determined and the method according to the invention cannot be applied.

What is claimed is:

1. A method for determining a return time of a returning light pulse by a Single Photon LiDAR (SPL) scanner for measuring the time between an outgoing pulse event and a return pulse event, the SPL scanner comprising:
    a low photon count detector for converting low amounts of photons or single photons to electrical signals, and
    a control and processing unit for processing the data and for determining the return time of the returning light pulse,
    wherein the control and processing unit is configured to perform the method comprising:
        identifying a group of detected photons potentially representing a return pulse event,
        selecting from the group of detected photons those photons which satisfy a criterion of being above a defined minimum of consecutively detected low amounts of photons or single photons,
        creating a return pulse signal out of the selected photons,
        identifying a rising edge and a falling edge of the return pulse signal, and
        determining the return time for the return pulse event by averaging between the rising edge and the falling edge of the return pulse signal.

2. The method of claim 1, wherein the detector of the SPL scanner is adapted to convert a single photon or a photon package to an electrical signal, the electrical signal being proportional to the number of photons detected in the package, the detector being a single-element detector, a multi-element detector, or a detector array.

3. The method of claim 1, wherein the detector of the SPL scanner is adapted to convert a single photon or a photon package to an electrical signal representing one event, the detector being a single-element detector, a multi-element detector, or a detector array.

4. The method of claim 1, wherein the SPL scanner is adapted for creating a multiplicity of return pulse signals based on a multiplicity of different probability thresholds for a photon creating a photoelectron to be converted into an electrical signal, the thresholds respectively being defined as different low amounts of photons in amplitude.

5. The method of claim 1, wherein the control and processing unit is adapted to determine an amplitude information for the return pulse event based on a time difference between the falling edge and the rising edge of the return pulse signal.

6. The method of claim 1, wherein the SPL scanner is adapted for scanning with a single lidar beam or for simultaneously scanning with multiple lidar beams, the multiple lidar beams being produced from a single transmitted laser pulse.

7. The method of claim 1, wherein the SPL scanner is adapted for creating a multiplicity of return pulse signals based on a multiplicity of different probability thresholds for a photon creating a photoelectron to be converted into an electrical signal, the thresholds respectively being defined as different low amounts of photons in amplitude.

8. The method of claim 1, further comprising checking whether the consecutively detected low amounts of photons or single photons are within a defined temporal probability distribution thereof.

9. A Single Photon LiDAR (SPL) scanner comprising:
a transmitter for transmitting a light pulse;
a low photon count detector for detecting a returning light pulse, the low photon count detection being adapted for converting low amounts of photons or single photons to electrical signals; and
a control and processing unit for processing the data and for determining the return time of the returning light pulse,
wherein the control and processing unit is configured to:
identify a group of detected photons potentially representing a return pulse event,
select from the group of detected photons those photons which satisfy a criterion of being above a defined minimum of consecutively detected low amounts of photons or single photons,
create a return pulse signal out of the selected photons,
identify a rising edge and a falling edge of the return pulse signal, and
determine the return time for the return pulse event by averaging between the rising edge and the falling edge of the return pulse signal.

10. The SPL scanner of claim 9, wherein the detector of the SPL scanner is adapted to convert a single photon or a photon package to an electrical signal, the electrical signal being proportional to the number of photons detected in the package, the detector being a single-element detector, a multi-element detector, or a detector array.

11. The SPL scanner of claim 9, wherein the detector of the SPL scanner is adapted to convert a single photon or a photon package to an electrical signal representing one event, the detector being a single-element detector, a multi-element detector, or a detector array.

12. The SPL scanner of claim 9, wherein the SPL scanner comprises a time to digital converter (TDC) with a high speed comparator.

13. The SPL scanner of claim 9, wherein the SPL scanner is adapted for creating a multiplicity of return pulse signals based on a multiplicity of different probability thresholds for a photon, creating a photoelectron to be converted into an electrical signal.

14. The SPL scanner claim 9, wherein the control and processing unit is configured to determine an amplitude information for the return pulse event based on a time difference between the falling edge and the rising edge of the return pulse signal.

15. The SPL scanner of claim 9, wherein the SPL scanner is configured for scanning with a single lidar beam or for simultaneously scanning with multiple lidar beams.

16. The SPL scanner of claim 9, the TDC being implemented using a field programmable gate array as a high resolution timing device.

17. A computer program product to be used within a method of claim 1, the computer program product being stored on the control and processing unit, and comprising program code configured such that when executed causes the controlling and processing unit to perform the following steps:
identifying a group of detected photons potentially representing a return pulse event,
select from the group of detected photons those photons which satisfy a criterion of being above a defined minimum of consecutively detected low amounts of photons or single photons,
creating a return pulse signal out of the selected photons,
identifying a rising edge and a falling edge of the return pulse signal, and
determining the return time for each return pulse event by averaging between the rising edge and the falling edge of the return pulse signal.

18. The computer program product of claim 17, wherein the steps comprise a check of whether the consecutively detected low amounts of photons or single photons are within a defined temporal probability distribution thereof.

19. The SPL scanner of claim 9, wherein the control and processing unit is configured to check whether the consecutively detected low amounts of photons or single photons are within a defined temporal probability distribution thereof.

* * * * *